United States Patent [19]

Schneider

[11] 4,025,735
[45] May 24, 1977

[54] NEGATIVE CONDUCTANCE NETWORK

[75] Inventor: Herbert Anton Schneider, Boulder, Colo.

[73] Assignee: Bell Telephone Laboratories, Incorporated, Murray Hill, N.J.

[22] Filed: Feb. 19, 1976

[21] Appl. No.: 659,501

[52] U.S. Cl. .......................... 179/170 G; 333/80 T
[51] Int. Cl.² .......................................... H04B 3/16
[58] Field of Search .................. 179/170 G, 170 R; 333/80 R, 80 T

[56] References Cited
UNITED STATES PATENTS

| | | | |
|---|---|---|---|
| 3,384,844 | 5/1968 | Meacham | 333/80 R |
| 3,544,734 | 12/1970 | Meacham | 179/170 G |
| 3,562,561 | 2/1971 | Klosterman | 333/80 R |
| 3,578,911 | 5/1971 | Bender et al. | 333/80 T |
| 3,986,152 | 10/1976 | Howell | 333/80 T |

Primary Examiner—William C. Cooper
Assistant Examiner—Randall P. Myers
Attorney, Agent, or Firm—Charles Scott Phelan

[57] ABSTRACT

Signal transmission circuit characteristics are supplemented by a negative conductance circuit in which current sources of complementary polarity are connected in shunt between the conductors of the signal circuit. Changes in the voltage level of one side of the signal circuit are sensed at a point common to the two sources and applied through a positive impedance to control the current output magnitude of one of the sources for effecting a supplementing of the signal circuit current as though the changed voltage level had been applied in the presence of a negative form of that impedance connected at that common point.

In additional embodiments, different, or variable, positive impedance are connected in the sensing circuit output coupling to cause the negative of such impedance to appear at such signal circuit terminal.

20 Claims, 14 Drawing Figures

NEGATIVE CONDUCTANCE NETWORK

BACKGROUND OF THE INVENTION

1. Field of the Invention

This invention relates to circuits for offsetting impedance effects in an electric circuit; and it relates, in particular, to a negative conductance network for that purpose.

2. Description of the Prior Art

Negative impedance converters and negative impedance boosters are known in the art for controlling circuit losses of various kinds. They often are inserted in series in a circuit path, but in some versions they are also shunted across the signal path. These prior art circuits usually are subject to at least one of a number of types of problems. For example, they display a nonlinear negative impedance characteristic, and they have a comparatively narrow voltage range in which they are effective as a negative impedance. To reduce the influence of the nonlinearity over a voltage range suitable for practical operation, a voltage supply that is three of four times as large as the operation range must be employed.

Such prior art circuits also usually are highly sensitive to temperature effects and to variations in power supply voltage. In addition, many also depend upon the compensated circuit as a source of operating potential for the compensating circuit. These difficulties make the prior art negative impedance circuits of only very limited value in communication systems wherein it is necessary to effect substantially precise control of current level. One example of such a system would be a private branch exchange having a time division multiplexed conference circuit to which a large number, e.g., six to 15, of conferees could be simultaneously connected.

SUMMARY OF THE INVENTION

Negative impedance circuits are rendered more useful in communication systems, in accordance with an illustrative embodiment of the present invention, in which a fixed current source and a variable current source are connected across a transmission circuit in opposite senses for supplying current with respect to a common node on the circuit. A feedback circuit senses changes in voltage at the node and operates through a positive impedance to adjust the variable source output to effect a supplementing of the transmission circuit current so that the transmission circuit load experiences the mentioned voltage change with a predetermined gain, i.e., as though the negative of that impedance were connected to the mentioned node.

It is one feature of the invention that a negative impedance appearing at the transmission circuit common node has a value and a character corresponding to a positive impedance connected in series in the feedback circuit. Thus, by properly configuring that positive impedance, the resistance, reactance, and frequency characteristics of the transmission circuit at the common node can be conveniently controlled.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Figure 1:
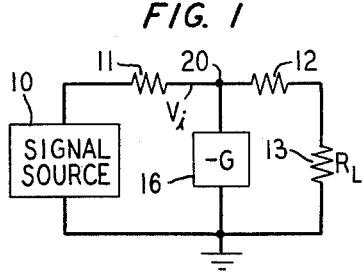
FIG. 1 is a simplified schematic diagram of a telecommunication system utilizing a shunt-connected negative impedance.

In FIG. 1 a signal source 10 in a communication system provides signals through a switched network, schematically represented by series connected resistors 11 and 12, to a load resistor 13, otherwise also designated $R_L$. The return signal path to the source 10 is effected by way of ground in the illustration of FIG. 1. In order to compensate for various predictable losses in the communication system, a negative conductance 16, otherwise designated −G in the drawing, is connected in shunt on the communication circuit at a circuit point which is advantageously located between the resistors 11 and 12. In considering the present invention in connection with, for example, a telephonic communication system, the invention will be illustratively described primarily as applied to a ground return circuit in a local central office on the 4-wire side of a hybrid transformer connection to a 2-wire loop circuit serving a subscriber.

Figure 1A:
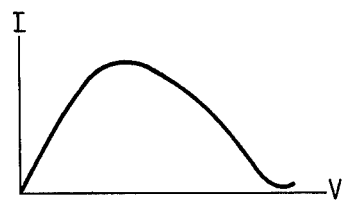
FIG. 1A is a current-versus-voltage characteristic of a typical prior art negative impedance circuit.

FIG. 1A depicts one typical current-versus-voltage characteristic of a negative conductance circuit constructed in accordance with prior art teachings and which might be employed in the environment illustrated in FIG. 1. It is apparent from FIG. 1A that the illustrated characteristic is not linear in the negative resistance, i.e., the negative slope, portion thereof. A wide range of configurations can be produced in the prior art circuits, but they usually have a very narrow linear range in the negative resistance portion.

Figure 2:
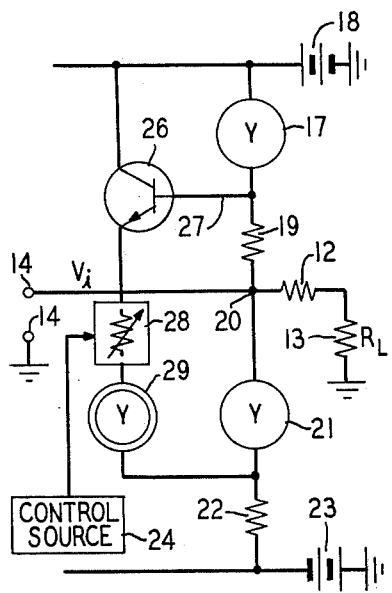
FIG. 2 is a schematic diagram, partially in symbolic form, of a negative conductance network in accordance with the present invention.

FIG. 2 is a simplified symbolic diagram of a negative conductance network in accordance with the invention, and of a type which can be applied as the negative conductance 16 in FIG. 1. Input signals from source 10 in FIG. 1 are applied between terminals 14, 14 in FIG. 2. In that figure a current source includes a source control element 17 and a positive potential supply such as the battery 18. The source control element has a fixed current output. A resistor 19 is connected in series between the element 17 and a terminal 20 in the signal conductor of the loop circuit shown in FIG. 1. Details of element 17, and other source control elements to be mentioned, will be hereinafter described. In the symbolic representation of source control element 17, a "Y" is included to indicate the direction of current flow for the source, in this case from battery 18 toward resistor 19.

A second current source, includes a control element 21 of similar type and a negative potential supply such as the battery 23 having its positive terminal grounded. A resistor 22 is connected in series between element 21 and battery 23 and is considered a part of the current source including element 21. The source control element 21 conducts current from the terminal 20 toward the source 23. Thus, looking at the part of FIG. 2 which has been considered so far, it might be characterized as that part of a negative conductance network connected to terminal 20 and corresponding to the negative conductance 16 in FIG. 1 which has been sliced in the plane of the drawing, and the positive current source part folded above the signal circuit terminal 20, while the negative current source part remains below that terminal.

Since the current output of the first source, including control element 17, remains constant, changes in the signal voltage V$i$ at terminal 20 with respect to ground are immediately translated to the upper terminal of resistor 19. A transistor 26 is connected as an emitter-follower with its collector receiving operating potential from the battery 18 and its conduction level controlled by a connction 27 from resistor 19 to the base terminal of the transistor. This transistor cooperates with the resistor 19 for sensing changes in the voltage V$i$ with respect to ground and applying those changes through a coupling impedance 28 and a further current source control element 29 to the output of the second current source control element 21. Impedance 28 can take different forms as will be hereinafter described; but for purposes of FIG. 2 it is shown as a variable resistor connected in series between transistor 26 and element 29, and control of the impedance is advantageously effected by signals from any appropriate control source 24. The resistance component of impedance 28 is advantageously larger than the total resistance of the resistors 12 and 13 to assure stability.

The current supplied by element 29 varies in accordance with the feedback signal supplied from transistor 26; and these variations produce corresponding changes in the current components in resistor 22 which is required, in accordance with the FIG. 2 symbolic representation, to carry a constant current that is equal to the current supplied by the source control element 17. A more precise schematic representation will be considered in connection with FIG. 4. The result of this arrangement is that element 21 provides a variable current, depending upon the amount of current supplied by current source control element 29, so that correspondingly variable parts of the output of source control element 17 are accepted in the source control element 21, and the remaining part of the output of source control element 17 is forced to flow through resistor 12 to the load resistor 13. Thus, variable portions of the output current of source control element 17 supplement the signal current produced by the voltage V$i$ to effect corresponding changes in the voltage across the load resistor 13.

For example, a positive-going excursion in V$i$ is immediately coupled to the base terminal of transistor 26 to cause that transistor to conduct at a higher level through the variable current source control element 29. This causes increased current in resistor 22 and thereby reduces the current component supplied by current source control element 21. Consequently a portion of the output current from source control element 17 is directed into the load resistor 13. Similarly, a negative-going signal excursion in V$i$ reduces the drive to transistor 26 and reduces the current from source control element 29 into resistor 22. Consequently, a larger proportion of the current in that resistor must be supplied by source control element 21, thereby forcing current to be withdrawn from the load resistor 13.

Figure 2A:
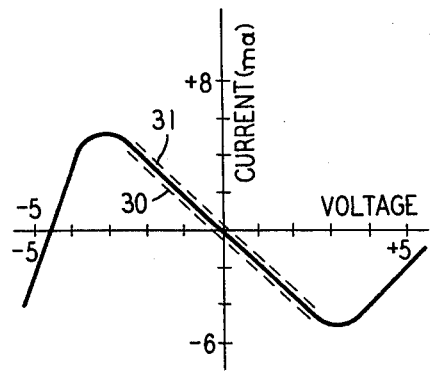
FIG. 2A is a current-versus-voltage characteristic of the invention as represented in FIG. 2.
Figure 4:
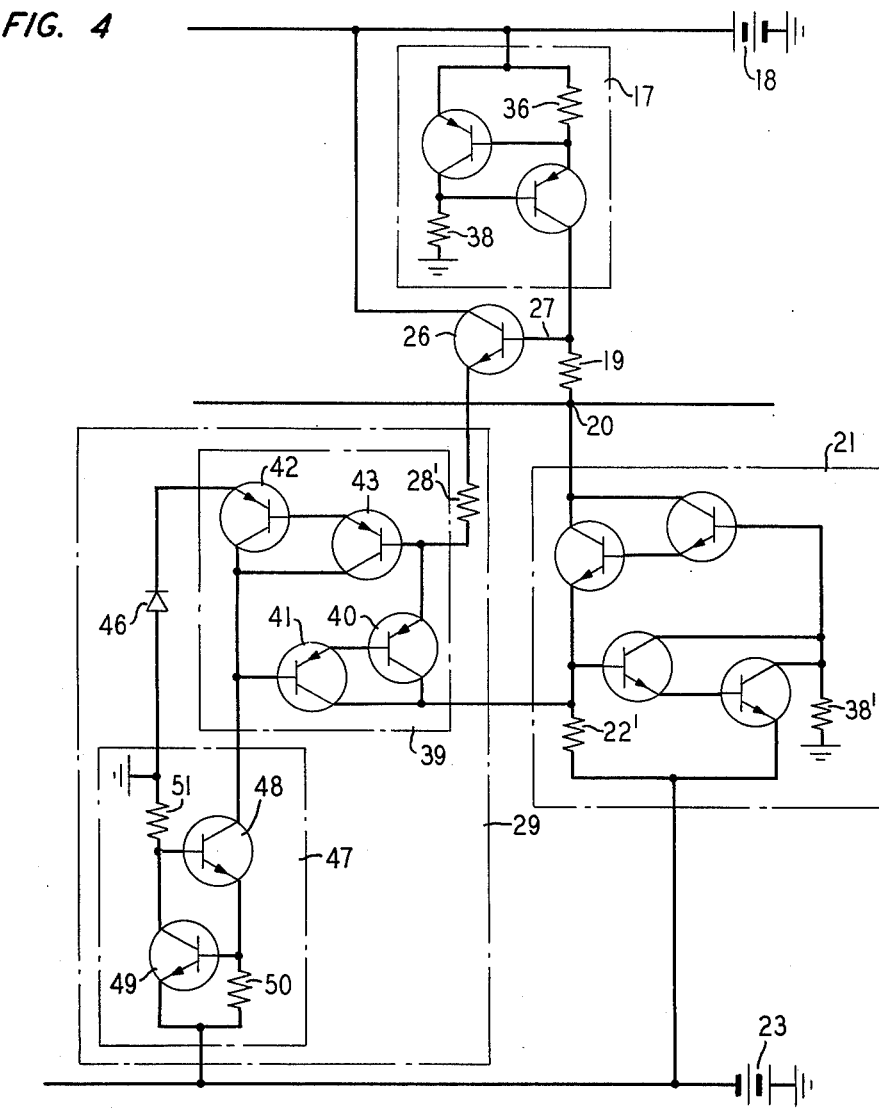
FIG. 4 is a schematic diagram of a negative conductance network in accordance with the present invention.

FIG. 2A illustrates the current-versus-voltage characteristic of the negative conductance network of FIG. 2 as specifically illustrated in FIG. 4, to be described. In FIG. 2A the current is the net output current of the current source control elements 17 and 21, i.e. the current source current flowing out of node 20 to load resistor 13, and the voltage is the voltage with respect to ground at the terminal 20. The numerical values shown in FIG. 2A are those obtained for the illustrative embodiment in FIG. 2 and constructed as will be described in connection with FIG. 4. FIG. 2A shows, for 6-volt supplies 18 and 23, a linear negative resistance characteristic extending between plus and minus 3 volts and between approximately plus and minus 5 milliamperes. This indicates a negative resistance characteristic of about 645 ohms appearing between terminal 20 and ground. That characteristic corresponds approximately to the negative version of the resistance of impedance 28 which was 600 ohms in that embodiment. It was found that the combination of the source impedance of the emitter-follower including the transistor 26 and the input impedance of current source control element 29 contributed the additional 45 ohms presented to the transmission circuit at node 20. The highly linear negative resistance characteristic is believed to be due to the high impedance offered by the current source control elements 17 and 21 at the terminal 20, the linear summation of currents in resistor 22, and the linear operation of emitter-follower and current sources. The extent of the negative resistance region is readily enlarged by simply increasing the terminal voltages of the sources 18 and 23.

The circuit arrangement of FIG. 2 proved to be highly stable in the presence of supply voltage changes. Thus, for example, the dashed lines 30 and 31 on the two sides of the negative resistance characteristic in FIG. 2A indicate the extent of translation, i.e., about ± 0.2 milliamperes, which occurred in that characteristic during changes in the supply voltage of ±1 volt for each of the batteries 18 and 23 in different combinations. Nevertheless, in spite of those supply voltage changes, the negative resistance characteristic remained essentially linear and constant in slope.

Voltage supplies 18 and 23 in FIG. 2 were selected to have equal and opposite polarity voltages with respect to the ground reference so that for zero alternating current voltage V$i$ the center of the negative resistance characteristic of FIG. 2A lies close to the origin for the characteristic. This makes the negative conductance network of FIG. 2 more useful because it can be employed in connection with an alternating current signal range, without the necessity for applying special additional bias arrangements to shift the operating point of the negative resistance characteristic as would be required for a characteristic of the type shown in FIG. 1A.

Figure 3A:
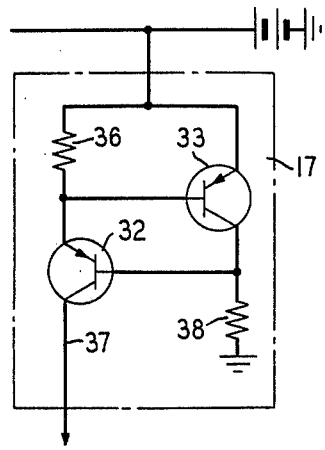
FIGS. 3A and 3B are schematic diagrams of two forms of current sources symbolically represented in FIG. 2.

FIG. 3A shows schematic detail of a current source control element, such as the element 17, which operates in conjunction with a positive voltage supply. This element includes two p-n-p transistors 32 and 33. The emitter terminal of transistor 32 is cross-coupled to the base of transistor 33, and the collector of the latter transistor is cross-coupled to the base of transistor 32. The supply lead for the control element is connected through a resistor 36 to the emitter terminal of transistor 32, and it is connected directly to the emitter terminal of transistor 33. The control, or output, lead for the current source control element is extended from the collector terminal of transistor 32; and the connector of transistor 33 is connected through a drain, or bias, resistor 38 to the reference potential point, which in the illustrative embodiment is ground. Feedback in the current source control element is supplied by transistor 33 with its base-emitter junction connected to bridge the emitter resistor 36 of transistor 32. This arrangement gives the overall current source a highly stable fixed current value and also reduces the dissipated power as compared to prior art circuits. That is, the feedback arrangement assures that the current in resistor 36 remains essentially constant. If the supply voltage changes, emitter-follower action and loop gain assure that the base voltages of the two transistors with respect to ground will track each other. Therefore, the bias on transistor 32 remains essentially constant, and its output current always remains essentially constant over a wide range of operating voltages. Likewise, a high impedance is presented by the element 17 at its output which is by way of the collector lead 37 of transistor 32 to resistor 19 in FIG. 2. It has been found that if the transistors 32 and 33 are replaced by Darlington equivalent transistors, e.g., as will be shown in connection with FIG. 4, the control effect, i.e., the constant current, provided by the control element is enhanced.

Figure 3B:
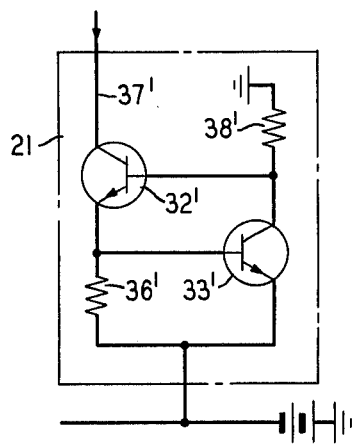

FIG. 3B illustrates in schematic detail the current source control element 21 and is typical of control elements utilized for cooperating with a negative supply voltage. In this case, n-p-n transistors are utilized instead of the p-n-p transistors employed in FIG. 3A. The current source control lead 37' in FIG. 3B is the lead which, in FIG. 2, extends from control element 21 to the terminal 20. Otherwise the similarity of FIG. 3B to FIG. 3A is evident and requires no further discussion. Further enhancement of the current constancy, or stability, of the elements of FIGS. 3A and 3B results if the resistors 38 and 38' are replaced by the elements 21 and 17, respectively; and the resistors 38' and 38, respectively, of the replacing control elements are connected through positive and negative battery, respectively, to ground to adjust for the level shift that takes place when the replacing elements have their respective supply terminals moved from battery to ground.

FIG. 4 depicts schematic detail of the negative conductance network described in connection with FIG. 2 and using Darlington equivalent transistor pairs for the variable current source control element 21 and for a part of the element 29. Otherwise, control elements 17 and 21 correspond to the schematic details thereof previously described in connection with FIGS. 3A and 3B, respectively. A resistor 28' is here used for the coupling impedance 28.

The variable control element 29 in the feedback connection is actually comprised of two current source control elements. A first of these two elements is a variable element 39 which is of the type depicted in FIG. 3A but employing Darlington equivalent transistor pairs and having a split supply connection. Thus, the control element 39 includes two transistors 40 and 41 connected as an equivalent Darlington transistor pair to provide the forward amplifier path of the current source control element 39 between resistor 28' and the connection to a resistor 22' in element 21. The feedback function in current source control element 39 is provided by transistors 42 and 43 connected as a further Darlington pair. However, the emitter connection of transistor 42 is connected to draw current from the ground reference by way of a diode 46, instead of being connected to the emitter lead of transistor 26 as would ordinarily be the case for the supply connection of the control element to cause resistor 28' to perform the current-fixing function of resistor 36 in FIG. 3A. This change is effected in order that the semiconductor junction of diode 46 and the base-emitter junctions of transistors 42 and 43 may cause a stabilization of the voltage at the input to current source control element 39 at the emitter terminal of transistor 40. This leaves element 39 free to have its current determined by transistor 26 and resistor 28'.

The controlled output of control element 39 extends to resistor 22' which also functions as a supply connection resistor for the current source control element 21. Resistor 22' corresponds to the resistor 36' in FIG. 3B, but it also functions as the resistor 22 in FIG. 2 in that it aids in fixing the current level of element 21. That is, current from element 39 in resistor 22' makes the entire element 21 appear to have proper current and so draw more or less from node 20 than it would otherwise draw if standing free as in FIG. 3B.

A fixed current source control element 47 includes two transistors 48, for forward gain, and 49, for feedback, in the manner of the current source control element illustrated in FIG. 3B. A resistor 50 is connected in series between the emitter-electrode of transistor 48 and the battery 23, while a resistor 51 provides the drain connection between ground and the collector electrode of transistor 49. Control element 49 thus fixes the amount of current that can be conducted by the drain connection of variable element 39 and thereby makes element 39 operate relatively independently of variations in supply voltage from battery 23.

The previously described connections in FIG. 4 give the current source control element 29 a low input impedance as a result of the grounded base configuration represented by the transistors 40, 41 connection and a constant input voltage because of the aforementioned three junctions, diode 46 and transistors 42 and 43, between ground and the control element input. Control element 29 also exhibits an output voltage which is close to the voltage of battery 23 by virtue of the connection through resistor 22', which in one illustrative embodiment was only 100 ohms. Thus, the element 29 exhibits a constant output voltage because of the voltage regulating property of the two emitter-base junctions of the feedback transistors shunting resistor 22' in element 21. Current source control element 47 fixes the bias current, or drain current, of current source control element 39 and thus renders the overall current source control element 29 insensitive to changes in the voltage of battery 23 as previously mentioned. Consequently, element 29 exhibits a constant output current in the sense that it is independent of loading imposed on it, but otherwise the output current of source 29 responds directly to the voltage variations at terminal 20 as sensed through resistor 19, transistor 26, and resistor 28'. A summary of resistor values in ohms for the illustrative embodiment of FIG. 4 using 6-volt batteries for 18 and 23 to produce the FIG. 2A characteristic is as follows:

| | | | |
|---|---|---|---|
| R19 | = 430 | R38 | = 12000 |
| R22' | = 100 | R38' | = 12000 |
| R28' | = 600 | R50 | = 330 |
| R36 | = 120 | R51 | = 8200 |

It is apparent that the illustrative embodiment of FIG. 4 is connected to the signal transmission circuit at terminal 20 and ground as shown in FIG. 1. That is, it is applied in shunt and can be readily so applied without interrupting the signal transmission circuit. This feature is advantageous in that large changes in loading can be handled by switching the number of negative impedance networks that are connected to the terminal 20. For example, as additional parties are added to a telephone conference circuit, additional networks 16 are also added to maintain the most advantageous impedance relationships.

Figure 5:
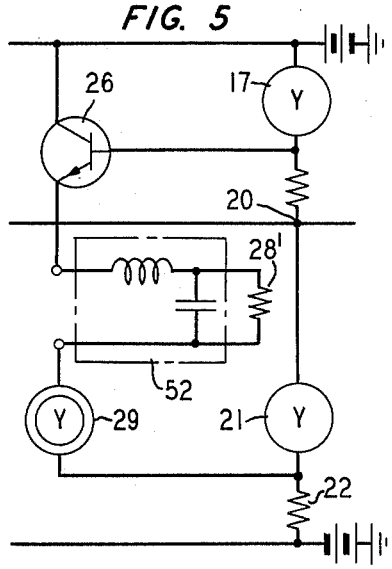
FIGS. 5 through 7 are modifications of the circuit of FIG. 4.

FIG. 5 illustrates a modified form of the negative conductance network of FIG. 2. If feedback loop integrity and stability are maintained, filter properties may be included in the negative conductance network without actually breaking the transmission path, i.e., without opening the signal transmission circuit at node 20 or short circuiting impedance 28. In FIG. 5 the feedback circuit resistor 28' has been placed across the output of a filter, in this case an inductance-capacitance, low-pass filter 52 which has its input connected in series in the feedback connection where resistor 28' was connected in FIG. 4. In this arrangement the negative resistance seen between the signal circuit terminal 20 and ground is the negative of the resistance of resistor 28' at signal frequencies in the passband of filter 52.

Figure 6:
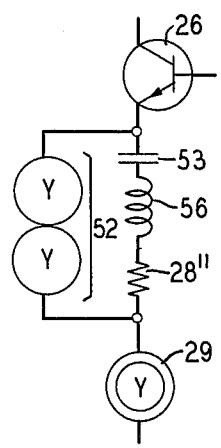

FIG. 6 is a further modification of the circuit of FIG. 4 wherein the resistor 28' has been replaced by a circuit comprising back-to-back current source control elements 52 connected in series in the feedback path. Thus, direct current loop integrity is maintained. In addition, a resistor 28'', a capacitor 53 and a coil 56 are connected in series with one another across the back-to-back current sources 52. With this connection, the negative impedance seen at terminal 20 in FIG. 4 is a negative resistance equal to the resistance of resistor 28'' (since elements 52 present a high impedance to the circuit) at the resonant frequency of capacitor 53 and coil 56. The negative impedance is a predominantly capacitive reactance at lower frequencies and a predominantly inductive reactance at higher frequencies. If the absolute value of the negative resistance at resonance is less than that of the external load, oscillation, i.e. signal generation, results. If coil 56 is short-circuited, the negative impedance appearing at terminal 20 is a combination of the reflected capacitor 53 and resistor 28''.

The back-to-back current source control elements 52 in FIG. 6 complete the direct current feedback path for the negative conductance network. Those elements comprise an element of the type shown in FIG. 3B, with its controlled current lead 37' connected to the emitter of transistor 26, and an element of the type shown in FIG. 3A, with its controlled current lead 37 connected to the element 29. Supply leads of the back-to-back elements are connected together and the normal battery connection thereto is eliminated. However, the drain resistors 38' and 38 of the two elements are connected to positive battery 18 and negative battery 23, respectively.

Figure 7:
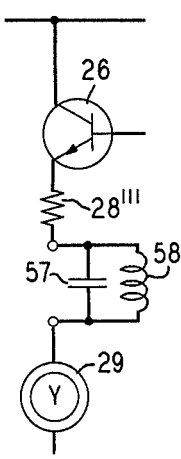

FIG. 7 is a still further modification of the circuit of FIG. 4. In this case the feedback resistor 28' is replaced by a resistor 28''' in series with a parallel-connected capacitor 57 and coil 58. As before, resistor 28''' must be larger than the load connection resistance at node 20 to prevent oscillation at low frequencies where the circuit between transistor 26 and element 29 would otherwise be essentially the low resistance of coil 58.

Figure 8:
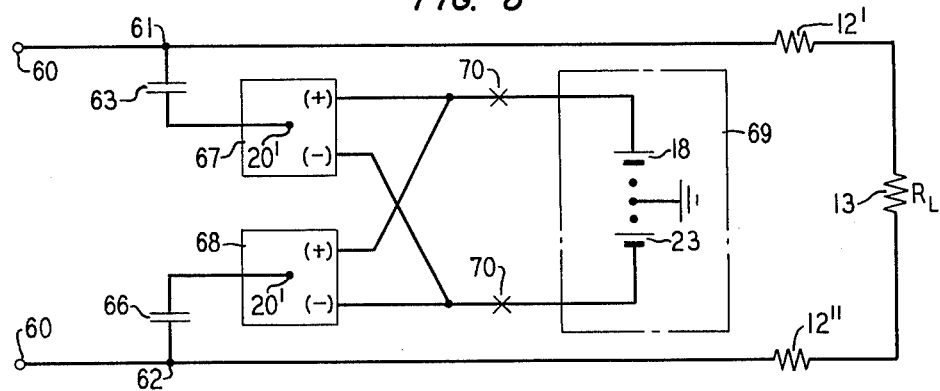
FIGS. 8, 8A, 8B, and 8C illustrate additional applications of the negative conductance network of the present invention.
Figure 8A:
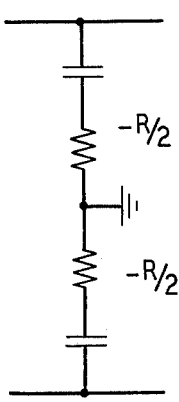

Previous discussions of the invention herein have been presented in the environment of a signal circuit that is unbalanced with respect to ground. FIG. 8 illustrates an application of the invention to a balanced signal circuit having input terminals 60, 60, balancing series resistors 12' and 12'', and the load resistor 13. Two terminals 61 and 62 on the signal circuit leads, respectively, are coupled by way of capacitors 63 and 66 to terminals 20' (corresponding to terminal 20 in FIG. 4) of negative conductance networks 67 and 68. Each of the networks 67 and 68 is advantageously of the type shown in FIG. 4 and has positive and negative supply connections, through X-marked terminals 70, 70, to the same batteries 18 and 23, respectively, in a supply block 69. Each of the networks has its own signal circuit conductor at its terminal 20', and they share ground (included in control elements in each of the networks 67 and 68 as shown in FIG. 4) as their further signal circuit conductor. Thus, in FIG. 8 the networks 67 and 68 have their sensing terminals only alternating-current coupled to the direct current signal path instead of being directly in that path. Consequently, they appear to the signal transmission circuit as a balanced negative impedance, as shown in FIG. 8A, even though each network is a negative resistance referenced to ground through the supply block 69.

Figure 8B:
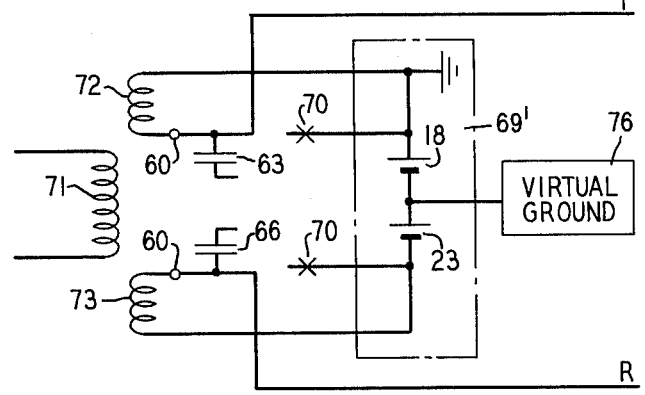

FIG. 8B is a partial schematic diagram of a modification of FIG. 8 showing one way in which to apply the concept of FIG. 8 to a repeating coil in a signal path for utilizing a central office or PBX supply instead of the separate batteries 18 and 23. A primary winding 71 on the central office side of the coil is coupled through secondary windings 72 and 73 of the coil and terminals 60 to the suscriber line tip and ring leads, respectively. Opposite terminals of windings 72 and 73 are connected to different terminals of central office battery 69' which has its positive terminal grounded. Networks 67 and 68 are coupled between terminals 60, 60 and 70, 70 as already described for FIG. 8. Now, however, the equivalent circuit has the ground shifted to the tip side of the signal circuit. The so-called further signal circuit conductor (ground in FIG. 8) shared by networks 67 and 68 is in FIG. 8B, a virtual ground 76 between batteries 18 and 23. That virtual ground is a common terminal to which the control elements in networks 67 and 68 are referenced. Thus, in each of the networks 67 and 68 the control element grounds at one terminal of each of resistors 38, 38', and 51 in FIG. 4 are removed and those same three terminals in each network are connected together and to the virtual ground 76 connected to batteries 18 and 23 in FIG. 8B. This provides an unbalanced battery connection but still requires the battery center tap.

Figure 8C:
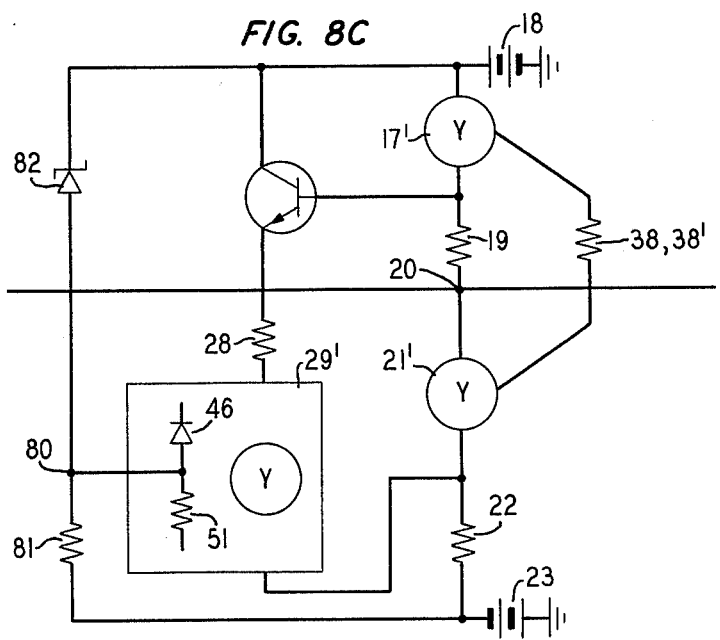

FIG. 8C illustrates a further modification of each of the networks 67 and 68 for use in FIG. 8B and which eliminates the need for the virtual ground 76 center tapped into the batteries and retains the unbalanced ground at the positive terminal of battery 18 in FIG. 8B. The modified negative conductance network shown in FIG. 8C is in symbolic form similar to FIG. 2 and using the same or similar reference characters for corresponding elements. Control elements 17' and 21' are as shown in FIG. 4 except that they are referenced to each other. That is, grounds on resistors 38 and 38' are deleted and the formerly grounded resistor terminals are connected together forming the resistor 38, 38' shown in FIG. 8C outside of the elements 17' and 21'. In addition, the source control element 29' which provides supplemental current to resistor 22 is referenced to an intermediate potential of the current sources including elements 17' and 21'. To do this the ground on resistor 51 in element 29' of FIG. 4 is deleted, and the formerly grounded resistor terminal is connected to a terminal 80 between a resistor 81 and a reverse breakdown diode 82 in a series connection between the positive battery 18 and the negative battery 23. Resistor 81 and diode 82 are selected to put the terminal 80 at approximately the midpotential of the combined batteries 18 and 23 in FIG. 8B.

Although the embodiments described herein are typically shunted on a signal transmission circuit to compensate for lumped or distributed shunt impedance effects, they can be used also to compensate at least in part for series impedance effects. Thus, a negative conductance network is connected in shunt with a given load resistance in a circuit having series resistance losses. The network is designed to present a negative resistance that is larger than the load resistance. Consequently, the parallel combination of the load resistance and the negative conductance network has a positive resistance of larger value than the load resistance alone; and the combination takes a much larger share of the total available circuit voltage thereby partially compensating for the series resistance.

Although the present invention has been described in connection with particular applications and embodiments thereof, it is to be understood that additional modifications, applications, and embodiments which will be obvious to those skilled in the art, are included within the spirit and scope of the invention.

What is claimed is:

1. In a communication system having at least one signal transmission circuit including at least first and second signal conductors, the improvement comprising a negative impedance network connected in shunt between those conductors and comprising
 a first current source of fixed output current and connected to conduct current from the second conductor to a signal circuit terminal on said first conductor,
 a second current source of controllable output current connected to conduct current from said first conductor terminal to said second conductor,
 means for sensing changes in voltage at the signal circuit terminal, and
 means, responsive to said sensing means, for supplementing current in said second current source for thereby modifying effects of said voltage changes.

2. The system in accordance with claim 1 in which each current source comprises
 a voltage supply connection,
 first and second transistors having an emitter of said first transistor cross-connected to the base of said second transistor and having the base of said first transistor cross-connected to a collector of said second transistor,
 means including a resistance for connecting the emitter of said first transistor to said supply connection,
 means for connecting the emitter of said second transistor directly to said supply connection,
 means for connecting the collector of said second transistor through a resistance to said second conductor, and
 means for connecting the collector of said first transistor to a controlled terminal, said controlled terminal being said signal circuit terminal for said first and second current sources.

3. The system in accordance with claim 2 in which said supplementing means comprises
 means for coupling an output of said sensing means to the emitter of said first transistor of said second current source.

4. The system in accordance with claim 1 in which said supplementing means comprises
 a third current source connected between said sensing means and said second current source for supplying a current level that is a function of the sensing means output signal,
 means for stabilizing the direct current level of the third current source input from said sensing means, and
 a fourth current source for establishing a substantially constant bias current between said second conductor and said third current source.

5. The system in accordance with claim 1 in which said supplementing means includes a predetermined impedance for coupling said sensing means to said supplementing means, and
 the impedance seen from said signal circuit at such terminal is the negative of said supplementing means predetermined impedance.

6. The system in accordance with claim 5 in which a load impedance is connected between said first and second conductors, and
 said predetermined impedance has an impedance magnitude which is larger than the impedance magnitude of said load impedance whereby the total impedance presented between said first and second conductors is positive and is larger than the load impedance.

7. The system in accordance with claim 5 in which said supplementing means includes
 means for controllably varying said predetermined impedance.

8. The system in accordance with claim 5 in which said supplementing means impedance is a resistor connected in series between the output of said sensing means and said supplementing means.

9. The system in accordance with claim 5 in which said supplementing means impedance comprises
 a low pass filter having its input connected in series between said sensing means and said supplementing means, and
 a resistance equal to said predetermined impedance is connected across an output of said filter.

10. The communication system in accordance with claim 5 in which said coupling impedance comprises
 a capacitor connected in a series circuit between an output of said sensing means and an input of said supplementing means, and
 means connected in shunt with a portion of said series circuit for shunting such portion with a substantially fixed current.

11. The communication system in accordance with claim 10 in which said series circuit portion further comprises an inductance connected in series with said capacitance, and means for preventing oscillations in said negative impedance network at the resonant frequency of said inductance and capacitance.

12. The system in accordance with claim 5 in which said coupling impedance comprises an inductance connected in series between an output of said sensing means and an input of said supplementing means.

13. The system in accordance with claim 12 in which said coupling impedance further comprises a capacitor connected in parallel with said inductance, and means for preventing oscillations in said negative impedance network at signal frequencies off the resonant frequency of said inductance and said capacitance.

14. The system in accordance with claim 1 in which there are provided another signal transmission circuit having a third conductor and sharing said second conductor, a further negative impedance network like the first-mentioned negative impedance network connected in shunt between the third conductor and the same second conductor, a communication circuit having fourth and fifth conductors and a load impedance connected at opposite terminals thereof to said fourth and fifth conductors, and means for coupling said fourth and fifth conductors to said first conductor of said first-mentioned signal transmission circuit and said third conductor of said other signal transmission circuit, respectively.

15. The system in accordance with claim 14 in which said supplementing means for each of said first-mentioned and further networks includes a predetermined impedance for coupling said sensing means to said supplementing means of such network, and said predetermined impedances have a total impedance magnitude which is larger than the impedance magnitude of said load impedance whereby the total impedance presented between said fourth and fifth conductors is positive and is larger than the load impedance.

16. The system in accordance with claim 14 in which said first-mentioned network includes a positive voltage supply connection in the first current source thereof, a negative voltage supply connection in the second current source thereof, means for referencing the voltages applied to said positive and negative supply connections to said shared second conductor, and means for connecting said further network current sources also to said positive and negative voltage supply connections of said first-mentioned network.

17. The system in accordance with claim 16 in which said communication circuit is electrically balanced with respect to ground, and means are provided for connecting said shared second conductor to ground.

18. The system in accordance with claim 16 in which said communication circuit is electrically unbalanced and has said fourth conductor thereof connected to ground, means are provided for connecting said positive voltage supply connection to ground, and means are provided for referencing to a virtual ground the voltages applied at said positive and negative voltage supply connections and said first and second current sources of said first-mentioned and further negative impedance networks.

19. The system in accordance with claim 18 in which there are provided a signal repeating coil comprising a primary winding and first and second secondary windings, means for coupling one terminal of each of said first and second windings to said fourth and fifth conductors, respectively, and means for coupling another terminal of each of said first and second windings to said positive terminal and to a negative terminal of said negative supply, respectively.

20. The system in accordance with claim 16 in which said communication circuit is electrically unbalanced and has said fourth conductor thereof connected to ground, means are provided for connecting a positive terminal of said positive supply to ground, and each of said negative impedance networks comprises means for referencing said first and second current source thereof to each other, and means for referencing said supplementing means to an intermediate potential of said first and second current sources.

* * * * *